US012427686B2

(12) United States Patent
Koons et al.

(10) Patent No.: US 12,427,686 B2
(45) Date of Patent: Sep. 30, 2025

(54) APPARATUS FOR TENSIONING A CABLE LACING TAPE

(71) Applicant: DANIELS MANUFACTURING CORPORATION, Orlando, FL (US)

(72) Inventors: Kirk Koons, Orlando, FL (US); Aron Bacs, Jr., Orlando, FL (US); Walt Simmons, Orlando, FL (US)

(73) Assignee: DANIELS MANUFACTURING CORPORATION, Orlando, FL (US)

(*) Notice: Subject to any disclaimer, the term of this patent is extended or adjusted under 35 U.S.C. 154(b) by 183 days.

(21) Appl. No.: 18/218,784

(22) Filed: Jul. 6, 2023

(65) Prior Publication Data

US 2024/0009878 A1 Jan. 11, 2024

Related U.S. Application Data

(60) Provisional application No. 63/358,692, filed on Jul. 6, 2022.

(51) Int. Cl.
*B26D 7/14* (2006.01)
*B65B 13/02* (2006.01)
*B65B 13/22* (2006.01)

(52) U.S. Cl.
CPC .............. *B26D 7/14* (2013.01); *B65B 13/025* (2013.01); *B65B 13/22* (2013.01)

(58) Field of Classification Search
CPC .......... B65B 13/025; B65B 13/22; B26D 7/14
See application file for complete search history.

(56) References Cited

U.S. PATENT DOCUMENTS

| | | | | |
|---|---|---|---|---|
| 1,607,999 A * | 11/1926 | Ragona | B65B 13/285 221/312 R |
| 1,617,387 A * | 2/1927 | Gerrard | B65B 13/285 140/93.6 |
| 4,064,918 A | 12/1977 | Pobuta et al. | |
| 4,081,002 A | 3/1978 | Violi | |
| 4,733,701 A | 3/1988 | Loisel et al. | |
| 5,137,060 A * | 8/1992 | Wolcott | B65B 13/027 140/123.6 |

(Continued)

FOREIGN PATENT DOCUMENTS

| | | |
|---|---|---|
| EP | 0521199 | 7/1991 |
| KR | 102226589 | 3/2021 |
| WO | WO2013003471 | 1/2013 |

*Primary Examiner* — Sean M Michalski
(74) *Attorney, Agent, or Firm* — ALLEN, DYER, DOPPELT & GILCHRIST, P.A.

(57) ABSTRACT

An apparatus for tensioning, terminating and cutting a cable lacing tape includes a housing, a shaft having a first end and a second end, a sliding worm gear coupled proximate the first end of the shaft, and a motor coupled proximate the second end of the shaft and configured to rotate the shaft. The apparatus also includes a biasing element coupled to the shaft between the sliding worm gear and the motor to exert a biasing force on the sliding worm gear and a capstan rotatably engaged to the sliding worm gear. In addition, the apparatus includes a cutting mechanism configured to cut the lacing tape when a predetermined torque on the capstan is exceeded. The biasing force is configured to prevent translation of the sliding worm gear until the predetermined torque on the capstan is exceeded and the translation of the sliding worm gear activates the cutting mechanism.

20 Claims, 5 Drawing Sheets

(56) References Cited

U.S. PATENT DOCUMENTS

| | | | | |
|---|---|---|---|---|
| 5,163,482 | A | 11/1992 | Wolcott | |
| 5,595,220 | A | 1/1997 | Leban et al. | |
| 5,921,290 | A * | 7/1999 | Dyer | B65B 13/027 140/93.2 |
| 6,047,742 | A | 4/2000 | Barlasov | |
| 6,648,378 | B1 | 11/2003 | Torres et al. | |
| 7,124,787 | B2 * | 10/2006 | Lueschen | B65B 13/027 140/93.2 |
| 11,511,894 | B2 * | 11/2022 | Hempe | B26D 7/14 |
| 2005/0115629 | A1 | 6/2005 | Bernard | |
| 2005/0178461 | A1 | 8/2005 | Magno, Jr. et al. | |
| 2005/0217749 | A1 | 10/2005 | Magno, Jr. et al. | |
| 2006/0107624 | A1 | 5/2006 | Yu Chen | |
| 2007/0089801 | A1 | 4/2007 | Hillegonds et al. | |
| 2008/0092981 | A1 | 4/2008 | Hillegonds et al. | |
| 2009/0071350 | A1 | 3/2009 | Fay | |
| 2009/0158942 | A1 | 6/2009 | Barlosev et al. | |
| 2010/0139805 | A1 * | 6/2010 | Sledzinski | B65B 13/027 140/93.2 |
| 2012/0067450 | A1 * | 3/2012 | Shafer | B65B 13/027 140/123.6 |
| 2012/0291231 | A1 | 11/2012 | Ku | |
| 2015/0267844 | A1 * | 9/2015 | Zantout | B65D 63/10 24/271 |
| 2015/0344160 | A1 * | 12/2015 | Yu Chen | B65B 13/22 53/582 |
| 2016/0236804 | A1 | 8/2016 | Weiby et al. | |
| 2018/0134426 | A1 * | 5/2018 | Yu Chen | B65B 13/345 |
| 2019/0329917 | A1 * | 10/2019 | Fildes | B65B 13/185 |

* cited by examiner

APPARATUS FOR TENSIONING A CABLE LACING TAPE

CROSS-REFERENCE TO RELATED APPLICATIONS

This application claims the benefit of U.S. provisional application No. 63/358,692 filed Jul. 6, 2022, which is hereby incorporated herein in its entirety by reference.

FIELD OF THE INVENTION

The present disclosure relates generally to the installation of a cable lacing tape and more particularly to an apparatus for tensioning, terminating, and cutting a cable lacing tape.

BACKGROUND

Cable lacing tapes may be used for a variety of applications. Modern cable lacing tapes typically are a thin, relatively flat, woven, or braided cord, often referred to as a "tape", having filaments that may be made of materials such as nylon, polyester, or aramid fiber, and which may be impregnated with coatings to enhance particular performance characteristics. However, cable lacing tape has drawbacks in that the cable lacing tape typically is tied by hand in a costly, labor-intensive, and time-consuming process. Due to these problems, several attempts have been made to automate the cable lacing and tensioning, terminating, and cutting process.

One such device for automated knot tying is described in U.S. Pat. No. 6,648,378. The described device includes an automatic knot-tying device for tying a discrete knot about a workpiece, such as a bundle of wires. The device works by pulling a lacing tape, transversely around the workpiece and wrapping the filament around the workpiece. A shuttle moves the filament between carriage rings and along the workpiece at the appropriate steps, and a plurality of hooks pull the filament away from the workpiece at the appropriate steps. The operation is finished by cinching, cutting, and reloading so that the resulting knot is discrete and secure. At least one drawback of the described device is that it requires a complicated mechanism to both wrap and tie a knot about the workpiece.

In still another example, International Application Number PCT/US2012/044413, describes a hand-held tool for tensioning and severing a cable tie. The device includes a reciprocating tensioning mechanism such as a pawl link for tensioning the cable tie tail, a locking mechanism to prevent further tensioning upon the attainment of a preselected tension level in the tie tail, and a severing device to sever the tie tail from the cable tie head once installed.

Yet another example is U.S. Pat. No. 9,701,428, which discloses an apparatus for tensioning and includes a housing, a spur shaft reciprocally coupled to the housing, a trigger operably coupled to the housing and to the spur shaft to effect translation of the spur shaft when the trigger is operably moved, a tensioning device mounted to the housing and operably coupled to the spur shaft such that translation of the spur shaft causes operation of the tensioning device, and a passage having an inlet and an outlet, the passage operably coupling the inlet and outlet to the tensioning device.

SUMMARY

An apparatus for tensioning, terminating and cutting a cable lacing tape is disclosed. The apparatus includes a housing, a shaft having a first end and a second end, a sliding worm gear coupled proximate the first end of the shaft, and a motor coupled proximate the second end of the shaft and configured to rotate the shaft. The apparatus also includes a biasing element coupled to the shaft between the sliding worm gear and the motor to exert a biasing force on the sliding worm gear, and a capstan rotatably engaged to the sliding worm gear and configured to receive the cable lacing tape. In addition, the apparatus includes a cutting mechanism configured to cut the lacing tape when a predetermined torque on the capstan is exceeded. The biasing force of the biasing element is configured to prevent translation of the sliding worm gear until the predetermined torque on the capstan is exceeded.

In a particular aspect, translation of the sliding worm gear activates the cutting mechanism. The cutting mechanism may comprise a lever and a cutting head, where the lever is configured to rotate the cutting head to cut the lacing tape when the lever is engaged by the translation of the sliding worm gear. The cutting head may comprise a blade configured to cut the lacing tape.

The capstan may comprise a gear coupled to the sliding worm gear, where the sliding worm gear may be configured to translate relative to the gear when the biasing force of the biasing element is exceeded.

The biasing element may comprise a spring, and the motor may be an electric motor or a pneumatic motor. The apparatus may include a trigger in communication with the motor, where the trigger is configured to activate the motor through the tensioning, terminating and cutting of the cable lacing tape.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

U.S. Patent Application No. 2015/0267844 and U.S. Pat. No. 9,682,806, each of which is incorporated herein by reference in its entirety, both generally disclose a cable lacing tie for holding a plurality of objects together. The disclosed cable lacing ties generally include a head assembly and a length of cable lacing tape that can be retained by the head assembly upon activation of a retainer of the head assembly. In the disclosed example cable lacing ties, a free end of the cable lacing tape is routed (generally be hand) through an opening in the head assembly around the retainer, which is actuatable from an unlocked position to a locked position by pulling the free end of the cable lacing tape with sufficient force.

In at least some instances, the cable lacing tape comprises a length of woven aramid fiber tape with a synthetic rubber coating attached to a polymer fastener. While the free end must be activated with sufficient force to actuate the retainer, this tape material may be difficult to grip by hand and furthermore may be difficult to grip mechanically utilizing the standard cam action of existing cable lacing tape guns due to the coating acting as a dry lubricant as well as the abrasive nature of the aramid fiber.

It has been found that a directional change, wrapping, and/or folding of the cable lacing tape assists in the grip allowing the tool to build tension in the cable lacing tape. This tension is required to both activate the retainer in the head assembly as well as activate the cutting action in the tool linkage (if available).

Figure 1:
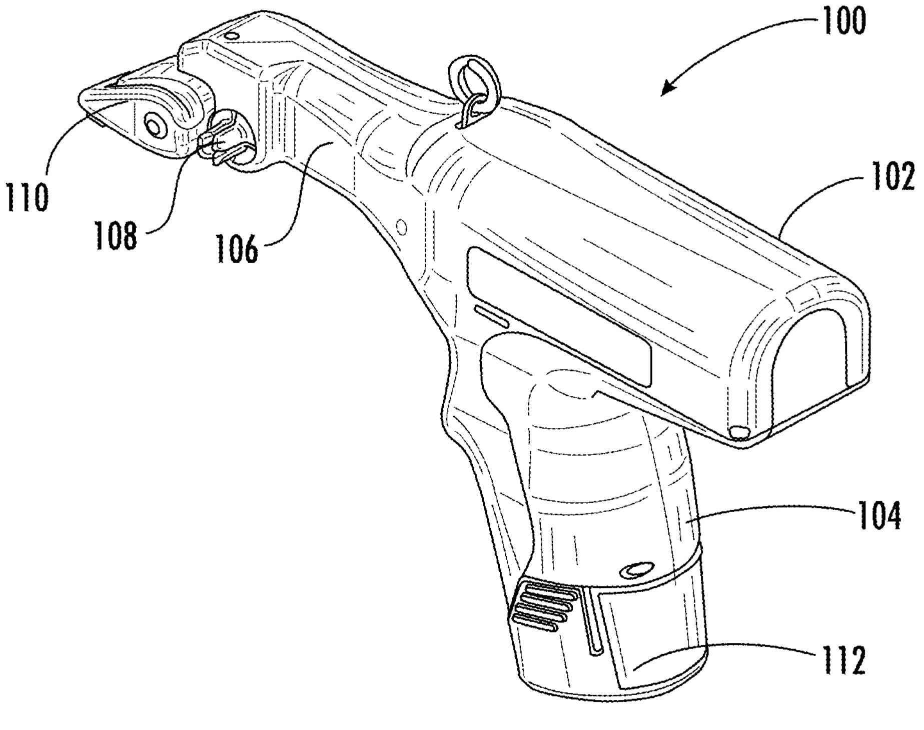
FIG. 1 is a perspective view of an apparatus for tensioning, terminating and cutting a cable lacing tape in which various aspects of the disclosure may be implemented.
Figure 2:
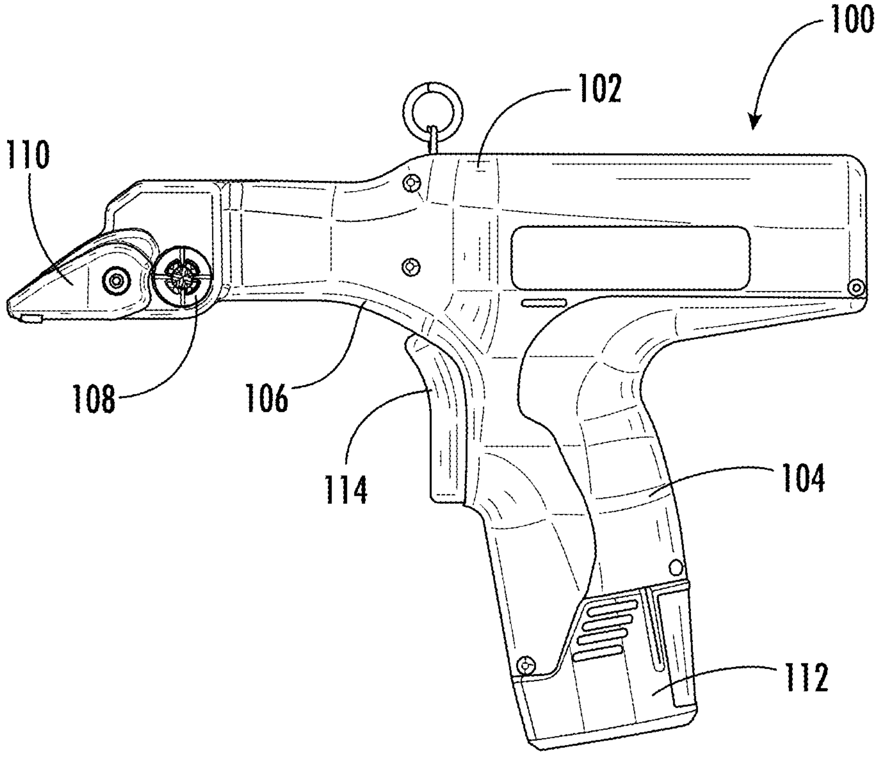
FIG. 2 is an elevational view of the apparatus of FIG. 1.

Referring now to FIGS. 1 and 2, an example apparatus 100 for tensioning and cutting a cable lacing tape is illustrated. As described herein, the example apparatus 100 tensions the cable lacing tape to the proper predetermined tension, then activates the retainer, and cuts a free end of the cable lacing tape once the predetermined tension is achieved.

The apparatus 100 includes a housing 102 in the general shape of a pistol or gun having a grip 104, trigger 114, and a barrel portion 106. In this example, a forward end of the barrel portion 106 includes an exposed capstan 108.

The apparatus 100 may include a battery 112 to provide power for operation. In operation, the cable lacing tape is loaded into the capstan 108 and the trigger 114 is depressed to cause an electric motor 120 to rotate a sliding worm gear 126 that is held in an initial position by means of a spring 124 as discussed in more detail below. The sliding worm gear 126 engages into a gear 130 that is coupled to the capstan 108 to rotate the capstan 108 to tension the cable lacing tape. After a predetermined torque on the capstan 108 is achieved and the retainer of the lacing tape head assembly (not shown) is activated, the spring tension is overcome to push the sliding worm gear 126 axially backward about its axis of rotation that then engages the cutting mechanism 110 to cut the cable lacing tape while maintaining the proper tension to not break it.

Figure 3:
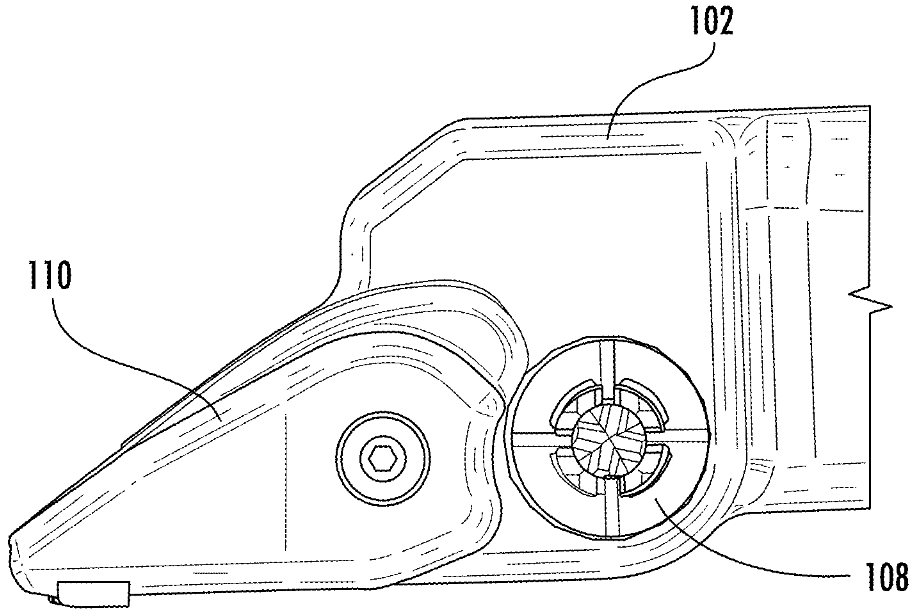
FIG. 3 is an elevational view of a nose piece and capstan of the apparatus of FIG. 1.
Figure 4:
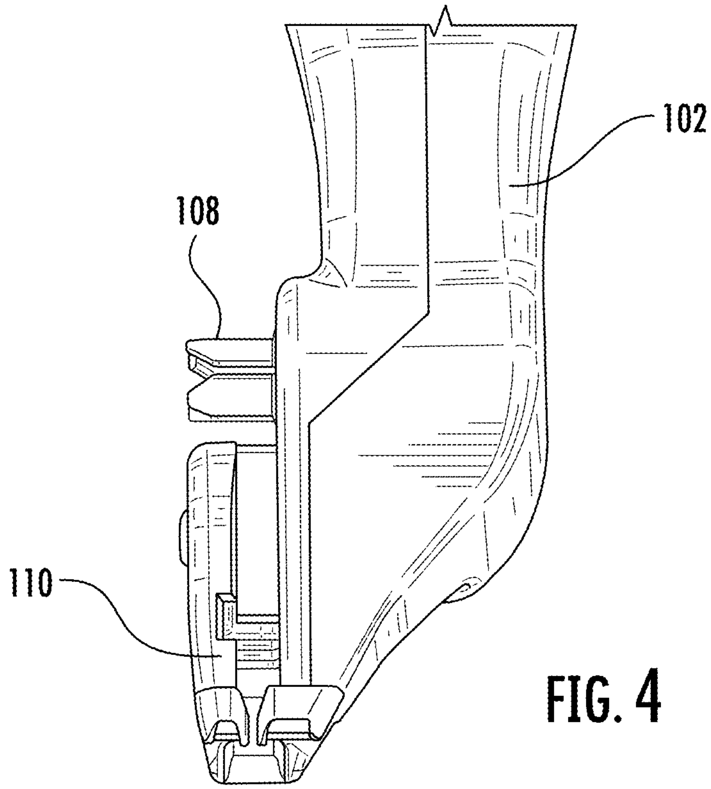
FIG. 4 is a bottom view of the nose piece and capstan.

The cutting mechanism 110 at an end of the barrel portion 106, as best shown in FIGS. 3 and 4, is configured for the cable lacing tape to be threaded. For example, the cable lacing tape can be fed through or under the cutting mechanism 110 and into the slits of the capstan 108 and the trigger 114 actuated to cause the capstan 108 to rotate. The capstan 108 is continued to rotate so that the cable lacing tape wraps around the outside of the capstan 108 until the nose of the cutting mechanism 110 rests against the head assembly of the cable lacing tie. As discussed above, this action causes tension in the cable lacing tape. Once a predetermined tension is achieved in the cable lacing tape, the retainer of the head assembly is actuated into the locked position.

Figure 5:
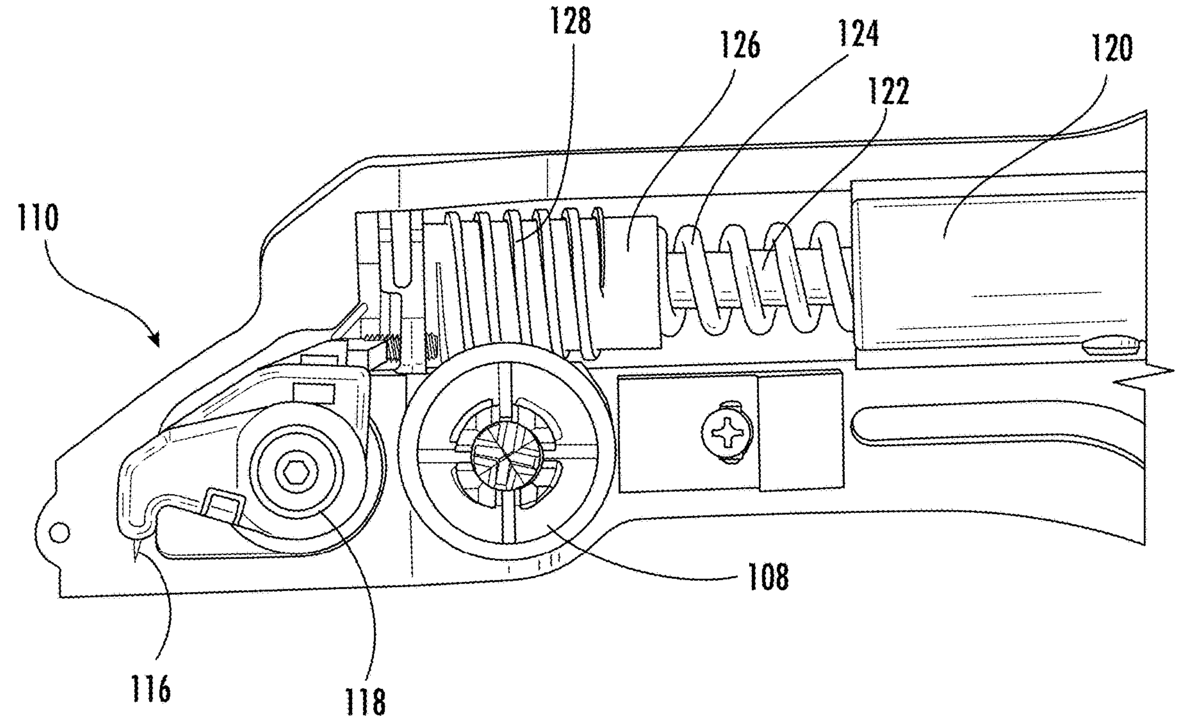
FIG. 5 is a detail view of a left side of the nose piece and capstan internals.
Figure 6:
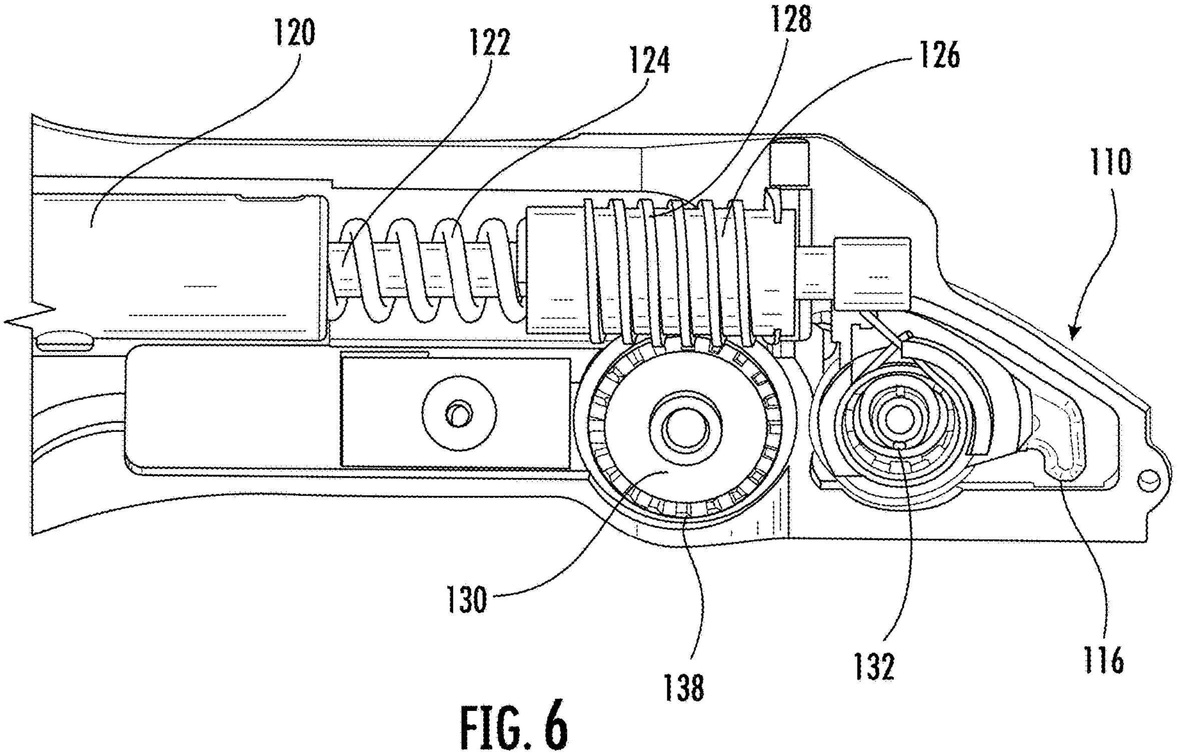
FIG. 6 is a detail view of a right side the nose piece and capstan internals.

As illustrated in FIGS. 5 and 6, a sidewall of the housing 102 has been cut away to show the internal parts of the apparatus 100. In particular, the motor 120 that drives the shaft 122 and sliding worm gear 126 is shown. The shaft 122 has a first end and a second end, where the sliding worm gear 126 is coupled proximate the first end of the shaft 122, and the motor is coupled proximate the second end of the shaft 122. A biasing element 124 is coupled to the shaft 122 between the sliding worm gear 126 and the motor 122 to exert a biasing force on the sliding worm gear 126. The biasing element 124 may comprise a spring, and the motor 120 may be an electric motor or a pneumatic motor, for example.

The capstan 108 is rotatably engaged to the sliding worm gear 126 that drives the capstan 108 in order to tighten and tension the cable lacing tape. The cutting mechanism 110 is configured to cut the lacing tape when a predetermined torque on the capstan 108 (or tension on the cable lacing tape) is exceeded. The biasing force of the biasing element 124 is configured to prevent translation of the sliding worm gear 126 until the predetermined torque on the capstan 108 (or tension on the cable lacing tape) is exceeded. The translation of the sliding worm gear 126 is what activates the cutting mechanism 110.

Figure 7:
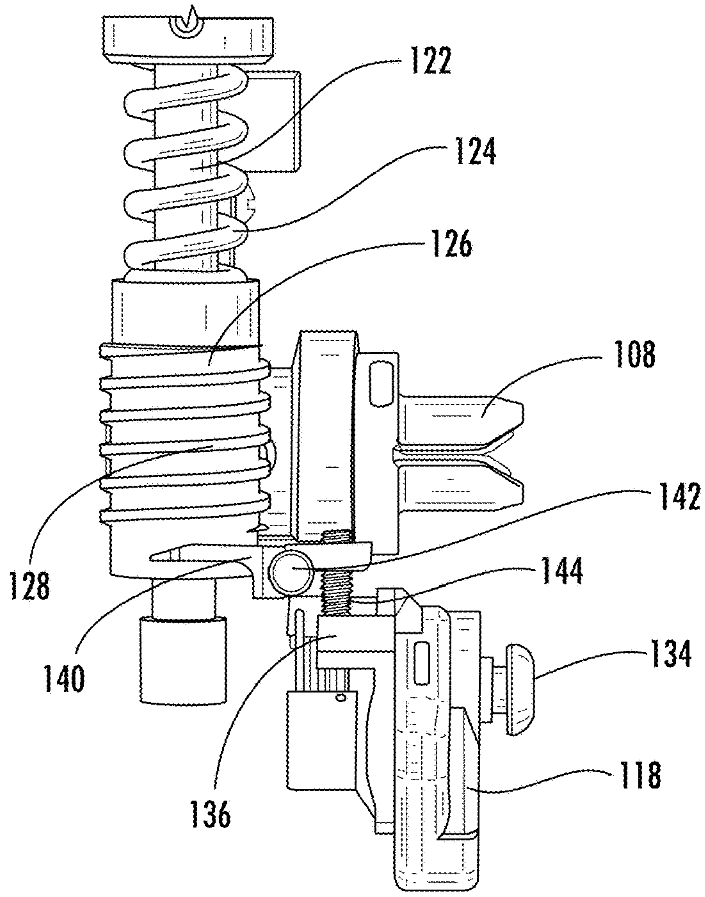
FIG. 7 is a top detail view of the nose piece and capstan internals.
Figure 8:
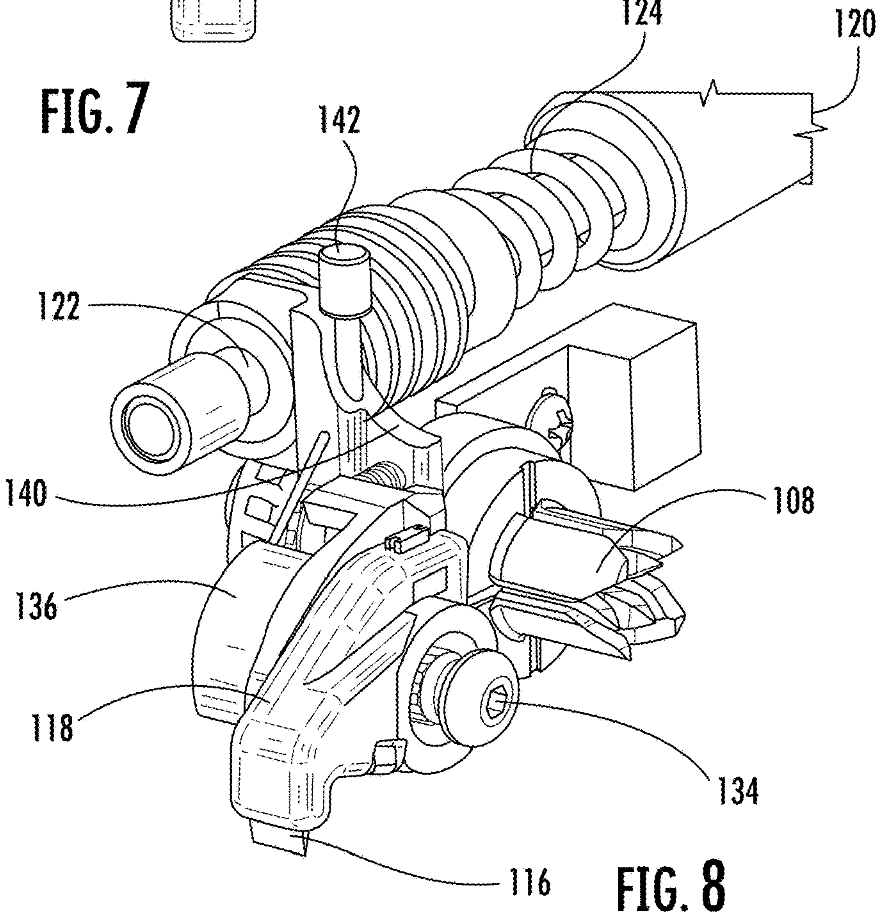
FIG. 8 is a front perspective detail view of the nose piece and capstan internals.

The cutting mechanism 110 may comprise a lever 140 and a cutting head 118 as best shown in FIGS. 7 and 8. The lever 140 is secured by a pin 142 that allows the lever to rotate. When a first end of the lever 140 is engaged by the translation of the sliding worm gear 126, the opposing second end of the lever 140 rotates about an axis defined by the pin 142. The second end of the lever 140 in turn engages and rotates the cutting head 118 via a connector 136 to cut the lacing tape when the lever 140 is engaged by the translation of the sliding worm gear 126. The cutting head 118 rotates about axis 134, which may be perpendicular to pin 142. The cutting head 118 includes a blade 116 configured to cut the lacing tape. A cutting head spring 132 of the connector 136 maintains the cutting head 118 and blade 116 within the barrel portion 106 until actuated. A bolt 144 coupled to the lever 140 may be adjusted to calibrate a distance between the lever 140 and the connector 136 for proper operation of the apparatus 100.

Figure 9:
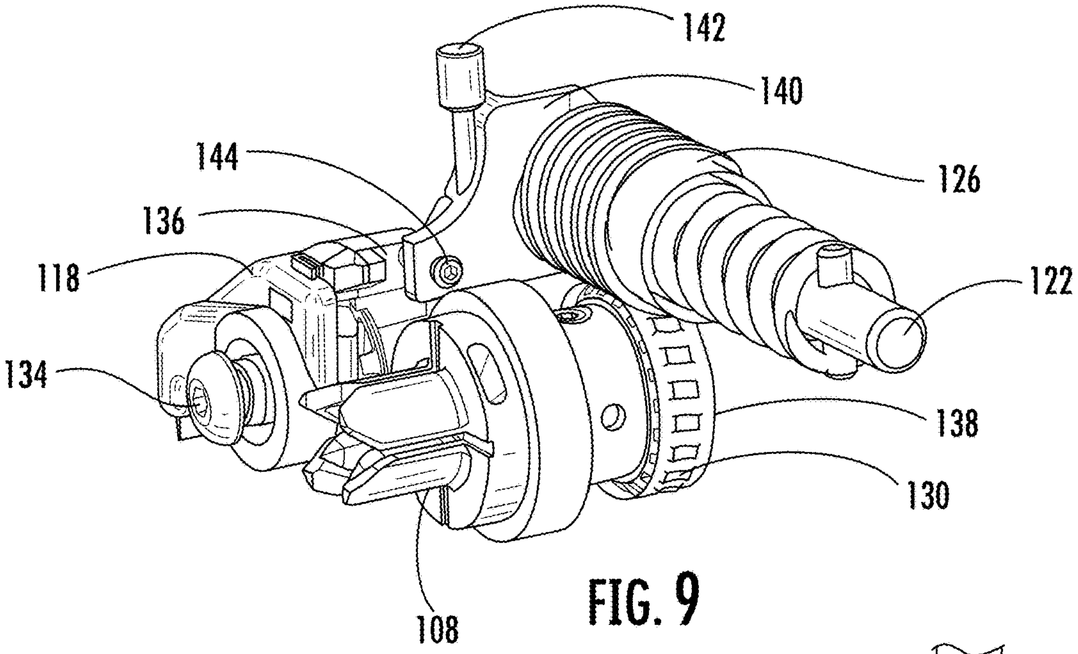
FIG. 9 is a rear perspective detail view of the nose piece and capstan internals.
Figure 10:
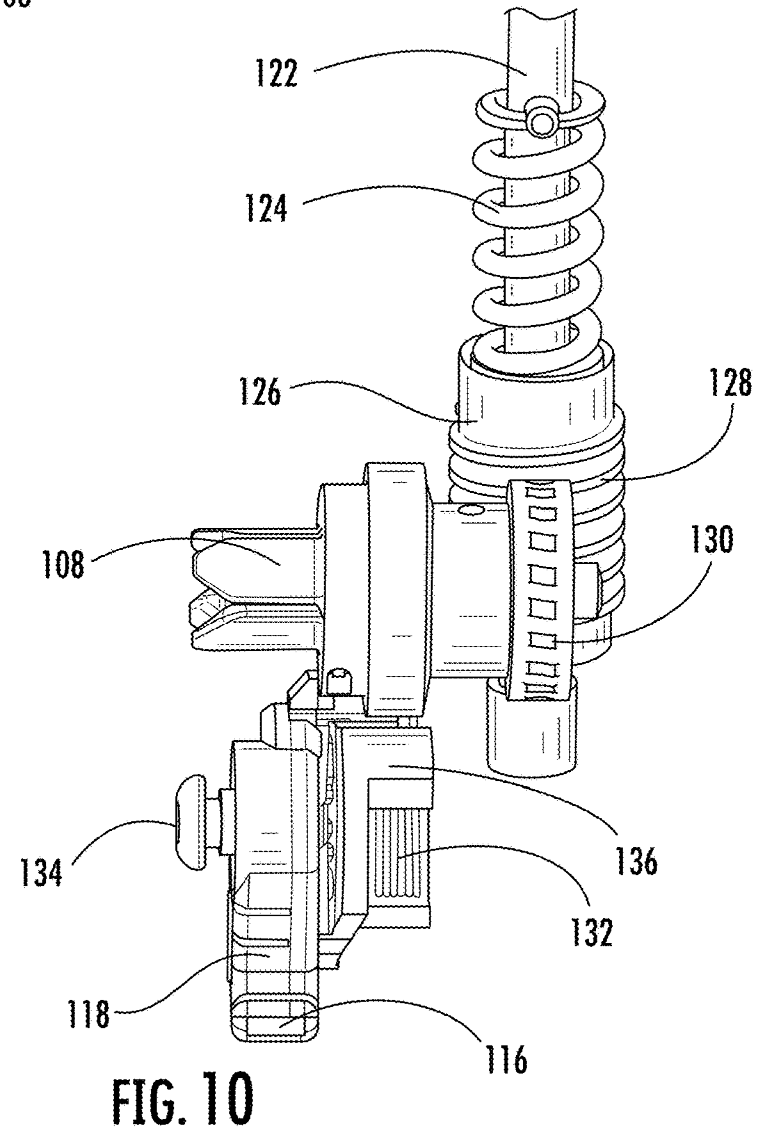
FIG. 10 is a bottom detail view of the nose piece and capstan internals.

Referring now to FIGS. 9 and 10, the translation of the sliding worm gear 126 is accomplished through the engagement of a gear 130 coupled to the capstan 108. For example, the sliding worm gear 126 may be configured to translate relative to the gear 130 when the biasing force of the biasing element 124 is exceeded. Otherwise, the sliding worm gear 126 rotates in a stationary location as the capstan 108 also rotates. Once the cable lacing tape is tightened and the capstan 108 can no longer rotate, teeth 138 on the gear 130 engaging threading 128 on the sliding worm gear 126 force the sliding worm gear 126 to translate relative to the gear 130 towards the motor 120, which is no longer rotating. Once the cutting mechanism 110 is activated as discussed above, and the cable lacing tape is cut, the capstan 108 (and gear 130) can rotate again and the sliding worm gear 126 is translated back to its initial position and ready to tighten another cable lacing tape.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An apparatus for tensioning, terminating and cutting a cable lacing tape comprising:

a housing;

a shaft having a first end and a second end;

a sliding worm gear coupled proximate the first end of the shaft;

a motor coupled proximate the second end of the shaft and configured to rotate the shaft;

a biasing element coupled to the shaft between the sliding worm gear and the motor to exert a biasing force on the sliding worm gear;

a capstan rotatably engaged to the sliding worm gear and configured to receive the cable lacing tape; and a cutting mechanism configured to cut the lacing tape when a predetermined torque on the capstan is exceeded.

2. The apparatus of claim 1, wherein the biasing force is configured to prevent translation of the sliding worm gear until the predetermined torque on the capstan is exceeded.

3. The apparatus of claim 2, wherein translation of the sliding worm gear activates the cutting mechanism.

4. The apparatus of claim 3, wherein the cutting mechanism comprises a lever and a cutting head, and the lever is configured to rotate the cutting head to cut the lacing tape when engaged by the translation of the sliding worm gear.

5. The apparatus of claim 4, wherein the cutting head comprises a blade configured to cut the lacing tape.

6. The apparatus of claim 5, wherein the capstan comprises a gear coupled to the sliding worm gear.

7. The apparatus of claim 6, wherein the sliding worm gear is configured to translate relative to the gear when the biasing force of the biasing element is exceeded.

8. The apparatus of claim 1, wherein the biasing element comprises a spring.

9. The apparatus of claim 1, wherein the motor is an electric motor or a pneumatic motor.

10. The apparatus of claim 1, further comprising a trigger in communication with the motor, and the trigger is configured to activate the motor through the tensioning and cutting of the cable lacing tape.

11. An apparatus for tensioning, terminating and cutting a cable lacing tape comprising:

a shaft having a first end and a second end;

a sliding worm gear coupled proximate the first end of the shaft;

a motor coupled proximate the second end of the shaft and configured to rotate the shaft;

a trigger in communication with the motor, the trigger configured to activate the motor through the tensioning and cutting of the cable lacing tape;

a spring coupled to the shaft between the sliding worm gear and the motor to exert a biasing force on the sliding worm gear;

a capstan having a first side configured to engage the cable lacing tape and a second side having a gear rotatably engaged to the sliding worm gear; and a cutting mechanism configured to cut the lacing tape when a predetermined torque on the capstan is exceeded causing the translation of the sliding worm gear to activate the cutting mechanism.

12. The apparatus of claim 11, wherein the cutting mechanism comprises a lever and a cutting head, and the lever is configured to rotate the cutting head to cut the lacing tape when engaged by the translation of the sliding worm gear.

13. The apparatus of claim 11, wherein the sliding worm gear is configured to translate relative to the gear when the biasing force of the biasing element is exceeded.

14. The apparatus of claim 11, wherein the motor is an electric motor or a pneumatic motor.

15. An apparatus for tensioning, terminating and cutting a cable lacing tape comprising:

a sliding worm gear;

a motor coupled to the sliding worm gear and configured to rotate the sliding worm gear;

a biasing element to exert a biasing force on the sliding worm gear;

a capstan rotatably engaged to the sliding worm gear and configured to receive the cable lacing tape; and a cutting mechanism configured to cut the lacing tape when a predetermined torque on the capstan is exceeded.

16. The apparatus of claim 15, further comprising a shaft having a first end and a second end, wherein the biasing element is positioned between the sliding worm gear and the motor.

17. The apparatus of claim 15, wherein the biasing force is configured to prevent translation of the sliding worm gear until the predetermined torque on the capstan is exceeded.

18. The apparatus of claim 15, wherein translation of the sliding worm gear activates the cutting mechanism.

19. The apparatus of claim 15, wherein the cutting mechanism comprises a lever and a cutting head, and the lever is configured to rotate the cutting head to cut the lacing tape when engaged by translation of the sliding worm gear.

20. The apparatus of claim 15, wherein the capstan comprises a gear coupled to the sliding worm gear.

* * * * *